United States Patent

[11] 3,601,038

| [72] | Inventor | Robert Henry Hayes<br>Parkway Beach Court Lot 23, Pomona, N.Y. 10970 |
|---|---|---|
| [21] | Appl. No. | 859,886 |
| [22] | Filed | Sept. 22, 1969 |
| [45] | Patented | Aug. 24, 1971 |

[54] FIREHOSE RETRACTOR
8 Claims, 8 Drawing Figs.

[52] U.S. Cl. .................................................. 100/100,
68/257, 100/121, 100/159, 100/171, 100/172,
100/173, 226/187, 239/197
[51] Int. Cl. ........................................................ B30b 3/04
[50] Field of Search ........................................... 226/186,
187; 222/102; 100/155, 121, 159, 172, 171, 173,
176, 169, 100, ; 68/244, 257, 265; 254/175.5,
175.7; 270/79; 239/197; 15/256.6; 137/355.16;
242/86, 86.2, 86.5, 86.6, 86.61, 158.2, 158.3

[56] References Cited
UNITED STATES PATENTS

| 1,224,046 | 4/1917 | Turley | 226/187 X |
| 1,632,875 | 6/1927 | Bouvier | 242/158.3 |
| 1,797,331 | 3/1931 | Dale | 242/158.3 |
| 2,301,208 | 11/1942 | Gear | 242/158.3 X |
| 2,403,099 | 7/1946 | Lear | 242/158.2 UX |
| 2,670,926 | 3/1954 | Sewell et al. | 226/186 |
| 3,181,455 | 5/1965 | Gouker et al. | 100/155 X |
| 3,531,059 | 9/1970 | Walker | 242/86.2 |

*Primary Examiner*—Billy J. Wilhite
*Attorney*—Polachek & Saulsbury

ABSTRACT: An automatic retractor for a firehose has laterally juxtaposed axially vertical rollers mounted on a laterally movable carriage. A hose guide ring is mounted on the carriage to guide the hose between the rollers. Individual electric motors drive the rollers. The motors are laterally connected by a spring. One motor is laterally movable on the carriage so that rollers can separate against spring bias when a hose coupling is encountered. The carriage is driven by a motor-driven shaft having a double helical groove. A groove follower carried by the carriage is engaged in the groove to move the carriage laterally in opposite directions.

Patented Aug. 24, 1971
3,601,038
4 Sheets-Sheet 1
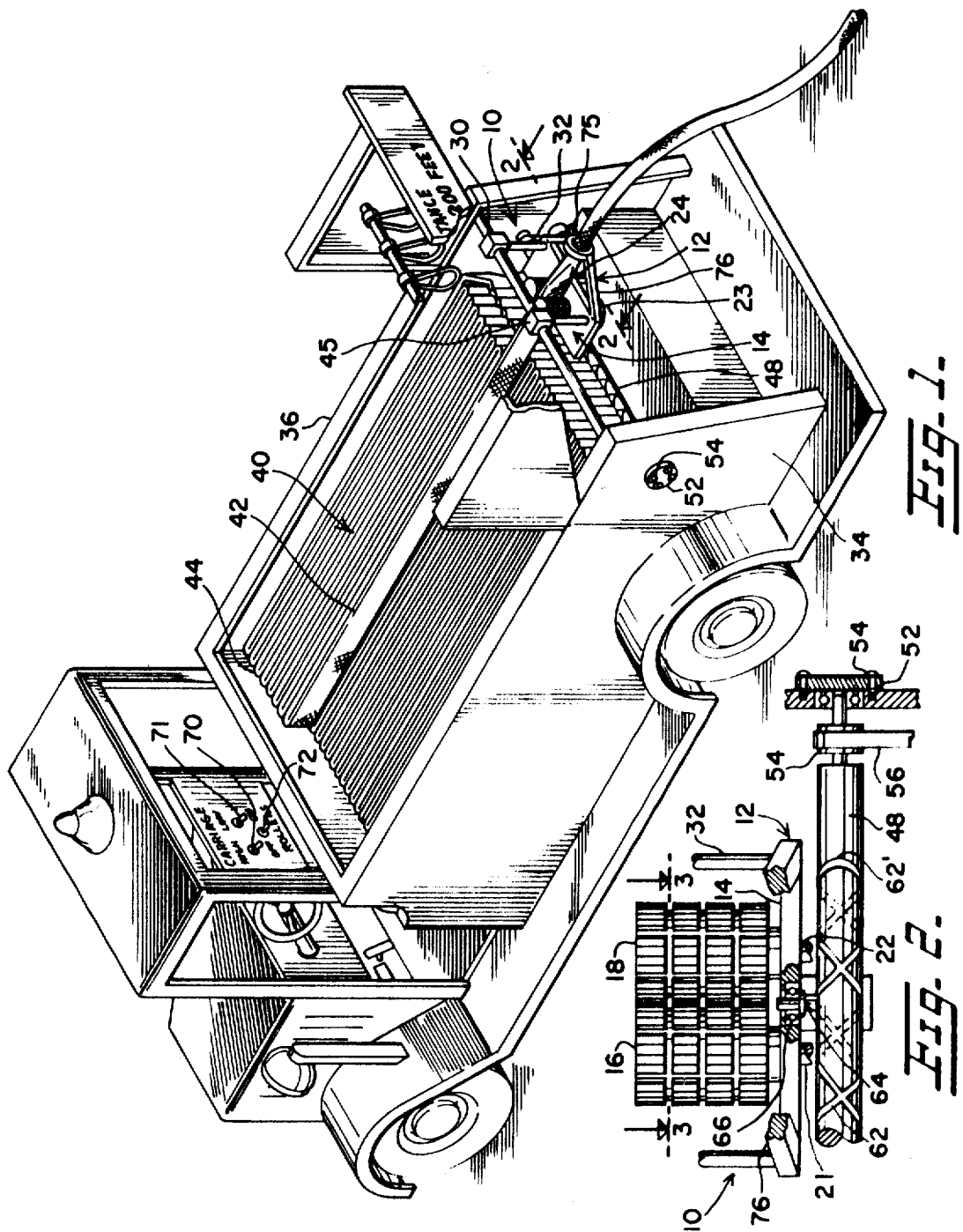
INVENTOR
ROBERT H. HAYES
BY Prachek & Saulsbury
ATTORNEYS

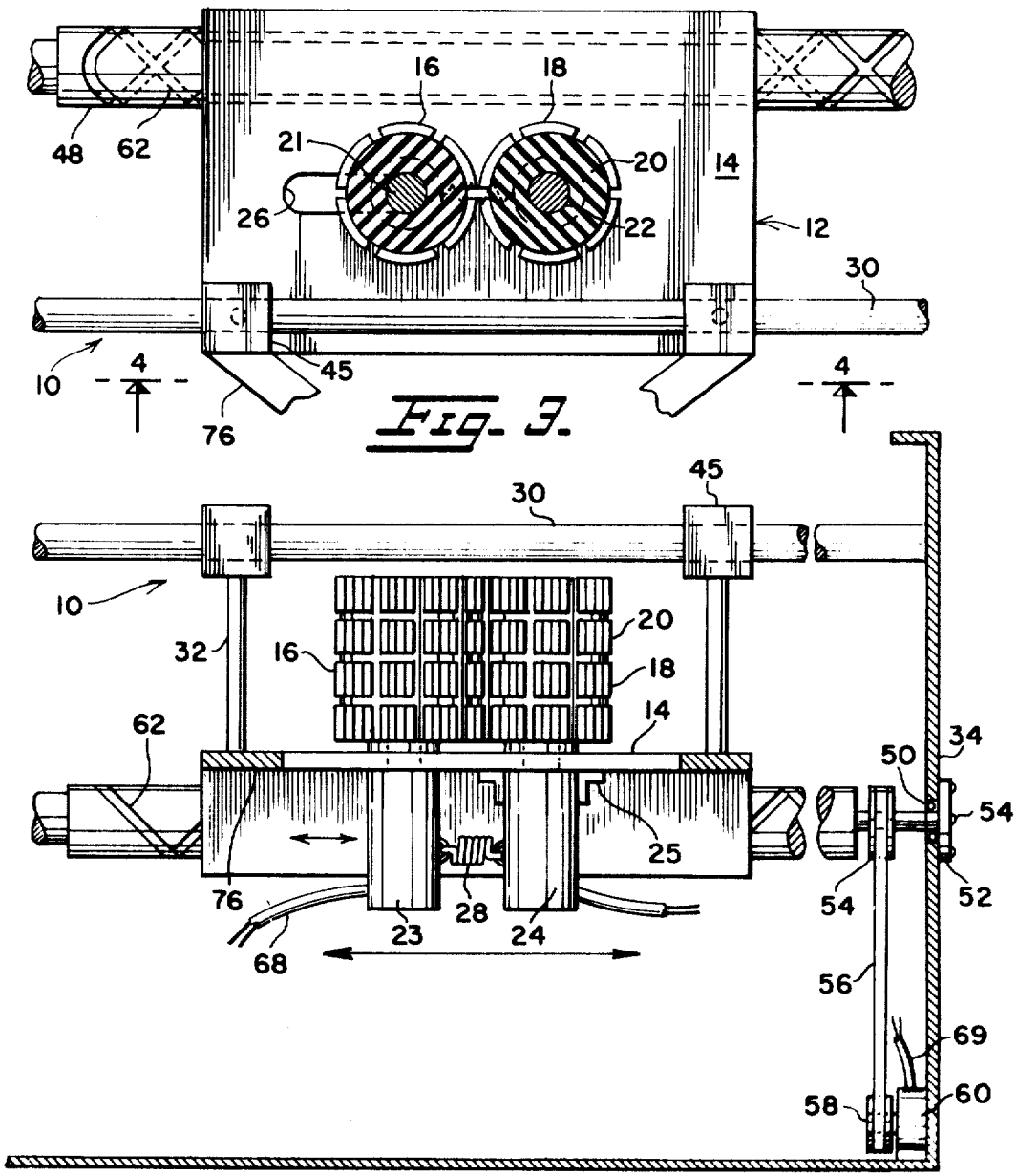

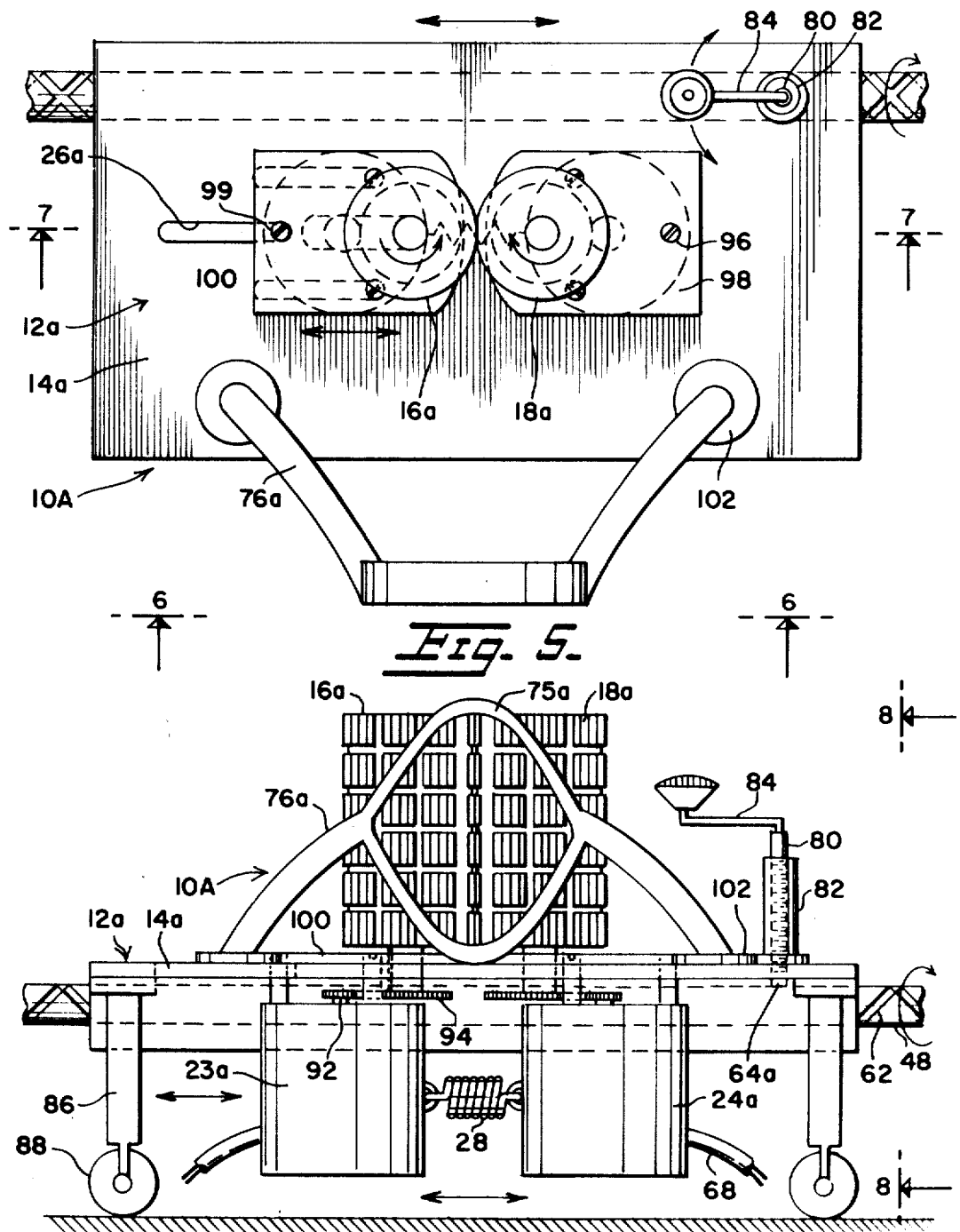

INVENTOR.
ROBERT H. HAYES

FIREHOSE RETRACTOR

This invention concerns automatic retraction apparatus for a firehose.

One of the most laborious tasks ans time-consuming tasks confronted by firemen involves replacing a long hose after use. This task requires manually folding the hose flat and draining out water while the hose is relaid in straight, flat, folded courses in a hose cart. The labor of firemen working outside the cart is required to carry the hose to the cart to drain out water and to flatten the hose, while other firemen inside the cart fold and arrange the hose in straight flat courses. Motor-driven retraction apparatus for firehoses heretofore known have rolled the hose on a reel. This is not practical for firehoses which may extend several hundred feet in length, since the reels would be unduly large, cumbersome and unmanageable. Long firehoses must be packed in straight courses in a cart and this has always been done manually.

The present invention is directed at providing apparatus which can be installed in any hose cart for automatically retracting a long hose. While the hose is being retracted it is squeezed flat to drain out water and to shape it properly for compact storage in a cart. The labor of several men heretofore required is reduced to that of one or two men who arrange the retracted, flattened hose in straight courses in the cart.

According to the invention a pair of motor-driven rollers are mounted on a carriage installed in a hose cart to retract the hose. The carriage is driven automatically from side to side to facilitate proper arrangement of the several courses of the hose in the cart.

It is therefore a principal object of the invention to provide a retractor for a long firehose, the hose being flattened and straightened while being retracted.

Another object is to provide a hose retractor as described, wherein the rollers are mounted on a laterally movable motor-driven carriage to facilitate storing the flattened courses of the hose in a hose cart.

For further comprehension of the invention, reference may be had to the following detailed description taken in connection with the accompanying drawing, in which:

FIG. 1 is a perspective view of hose retraction apparatus embodying the invention shown installed in a hose cart.

FIG. 2 is an enlarged fragmentary vertical sectional view taken on line 2—2 of FIG. 1.

FIG. 3 is a further enlarged horizontal sectional view taken on line 3—3 of FIG. 2.

FIG. 4 is an elevational view taken on line 4—4 of FIG. 3.

FIG. 5 is a top plan view of part of another apparatus embodying a modification of the invention.

FIG. 6 is an elevational view taken on line 6—6 of FIG. 5.

Figure 7:
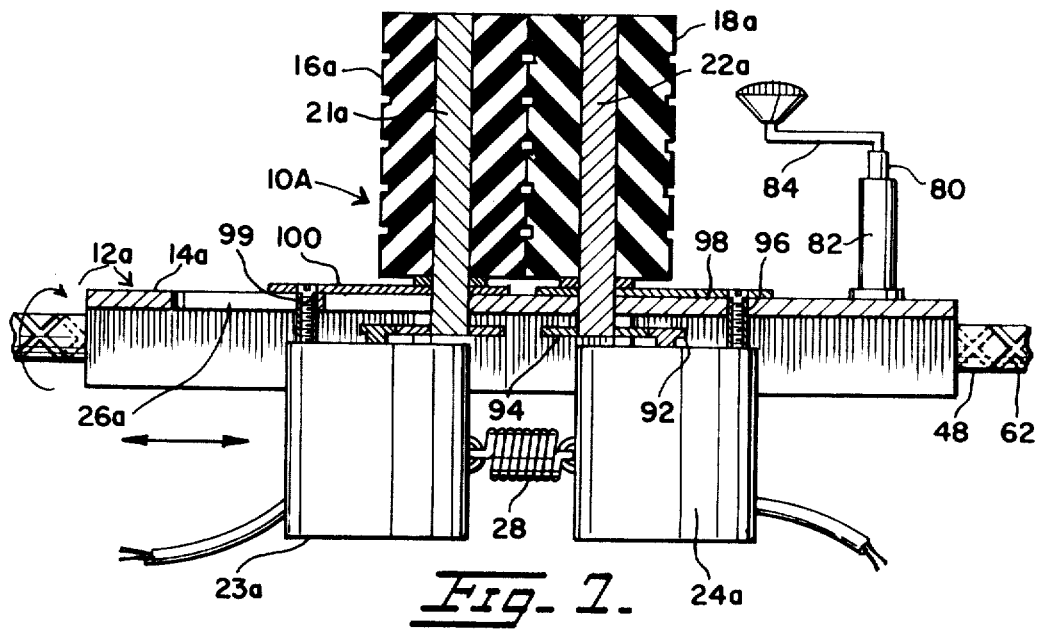
FIG. 7 is a vertical sectional view taken on line 8—8 of FIG. 6.

Referring first to FIGS. 1–4, there is shown apparatus 10 including a carriage 12. This carriage has a flat, horizontal platform 14 on which is rotatably mounted a pair of axially vertical rollers 16, 18. The rollers have corrugated or grooved resilient rubber jackets 20 secured on vertical shafts 21, 22 of two electric motors 23, 24. Motor 24 is secured by bracket 25 to the underside of platform 14. Motor 23 is movable laterally under the platform along with roller 16 above the platform. A slot 26 is provided in the platform through which shaft 21 extends and in which the shaft is laterally slidable. A coil spring 28 yieldably connects the sides of the two motors. By this arrangement, the rollers 16, 18 can be forced apart when a hose coupling or nozzle must pass between the rollers.

Carriage 12 moves laterally on a stationary horizontal rail 30 from which the carriage is suspended by bars 32. The rail is secured at opposite sidewalls 34 of a cart 36 in which hose 40 is stored in orderly side by side straight courses 42 with folds 44 at opposite ends. Bearings 45 at upper ends of the bars 32 are slidably engaged on rail 30.

In order to drive the carriage laterally there is provided a horizontal shaft 48 journaled in bearings 50 at opposite walls 34 of the cart. Plates 52 are mounted by screws 53 on walls 34 cover ends of the shaft. On shaft 48 is a pulley 54 which may be of a known slip-clutch type. A belt 56 is entrained on the pulley and on a drive pulley 58 driven by another motor 60 mounted at the inner side of one wall 34; see FIG. 4. Shaft 48 has a crossed, double helical groove 62. Opposite ends 62' of the groove connect the two crossed parts of the groove. A follower pin 64 is pivotally mounted in a bearing 66 secured in platform 14. The pin 64 extends downwardly and is engaged in groove 62. Cables 68, 69 extend from the motors to a suitable power supply such as an electric generator or battery carried by the cart. Switches 70, 71 and 72 are provided on panel 74 at the front of the cart. They are connected in circuit with the motors. Upper switches 70 and 71 turn on carriage drive motor 60 for high- and low-speed operation respectively. Lower switch 72 turns on roller drive motors 23 and 24.

In operation of apparatus 10, hose 40 is dressed through a guide ring 75 carried by brace bars 76 on platform 14 in front of rollers 16, 18. Then the hose extends between rollers 16, 18 which are urged together by spring 28. This squeezes the hose flat in a vertical plane. When the motors are turned on by operation of switches 71 and 72 the hose will be drawn forwardly into the cart where a fireman inside the cart can arrange the drained and flattened hose in the folded courses shown in FIG. 1. The carriage 12 will be driven laterally automatically as pin 64 follows the double helical groove 62. If it is desired to drive carriage at high speed to locate it at any point between the sidewalls, then switch 70 can be operated.

Figure 8:
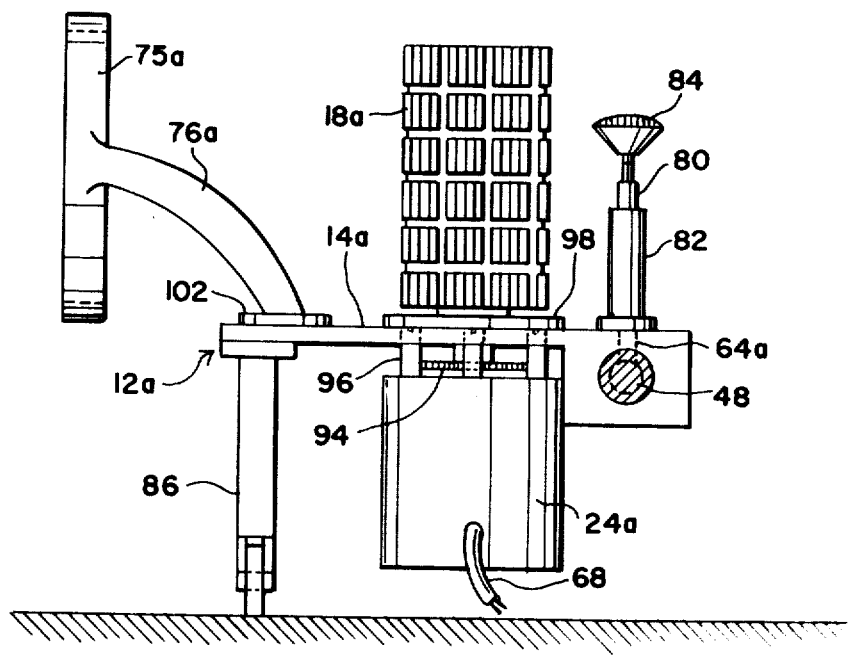
FIG. 8 is a side elevational view taken on line 8—8 of FIG. 6.

FIG. 5–8 show another hose retraction apparatus 10A which is generally similar to apparatus 10 and corresponding parts are identically numbered. In apparatus 10A, pin 64a is located at the lower end of a screw shaft 80 mounted in an axially vertical stationary sleeve 82 and rotatable by handle 84. The sleeve is mounted on platform 14a of carriage 12a. By this arrangement, the pin can be disengaged from the crossed helical groove 62 of shaft 48 at any time and the carriage can be moved manually to any point between the sidewalls of the hose cart shown in FIG. 1. The carriage is supported on legs 86 provided with wheels 88 to ride on the bottom 90 of the cart 36. Motors 23a and 24a drive gears 92 which are meshed with gears 94 at the lower ends of shafts 21a and 22a carrying rollers 16, 18a. Motor 24a is mounted in a stationary position by means of screw posts 96 secured to a stationary plate 98 on platform 14a. Motor 23a is secured by screw posts 99 to a support plate 100 laterally slidable on platform 14a. The posts 99 extend through slots 26a formed in the platform 14a. The posts 99 extend through slots 26a formed in the platform; see FIGS. 5 and 7. Brace bars 76a which support ring 75a are mounted by flanges 102 welded to the top of platform 14a.

Operation of apparatus 14A is similar to that of apparatus 10. The carriage will be driven automatically by motor-driven shaft 48. However if the shaft is disengaged from the platform by manual turning of handle 84, then the carriage can be located wherever desired between the sidewalls of the hose cart. The pin 64a can be reengaged in groove 62 by turning handle 84 in opposite direction. The hose is passed through ring 75a and between rollers 16a and 18a for flattening the hose while it is automatically retracted into the hose cart. When a coupling is encountered in the hose, the rollers separate automatically against bias in spring 28, and then the rollers are drawn together again.

The apparatus described, can be installed in existing hose carts or it can be installed as original equipment. The apparatus can be installed at fixed locations such as standpipes in buildings or wherever long lengths of hose are required to be retracted and flattened automatically.

What is claimed is:

1. Apparatus for retracting and flattening a long, flexible hose, comprising a carriage; a pair of rollers rotatably mounted in the carriage in axially parallel laterally adjacent position for drawing said hose therebetween while flattening the same; guide means carried by said carriage and disposed in advance of the rollers for guiding the hose between the rollers; motor means operatively connected to the rollers rotate the same; means for driving the carriage laterally so that the flattened hose can be manually stored in side by side straight courses after passing between the rollers, means mounting one of said rollers for lateral movement away from and toward the other roller to permit couplings on the hose to pass between the rollers, said carriage comprising a platform, and said motor means comprising a pair of electric motors carried by the carriage under the platform, and respectively connected to the rollers.

2. Apparatus as defined in claim 1, further comprising spring means laterally connecting the motors to permit lateral movement of one of the rollers with respect to the other roller to permit couplings on the hose to pass between the rollers.

3. Apparatus as defined in claim 1, wherein the carriage drive means comprises an electric motor, a horizontal shaft rotatably journaled at opposite ends operatively driven by said motor, said shaft having a helical groove therein, and groove follower means carried by the carriage and engaged in said groove so that the carriage moves laterally when the shaft is driven by said motor.

4. Apparatus as defined in claim 3, wherein said carriage comprises a platform, wherein said motor means comprises a pair of other electric motors carried by the carriage under the platform and respectively connected to the rollers, and wherein said groove has cross helical turns with communicating opposite ends so that the carriage moves laterally in opposite directions automatically while the shaft rotates in on one direction.

5. Apparatus as defined in claim 4, further comprising spring means laterally connecting said other motors to permit lateral movement of one of the rollers with respect to the other roller to permit couplings on the hose to pass between the rollers.

6. Apparatus as defined in claim 3, wherein said groove follower means is a pin, and means retractably supporting said pin for withdrawal from said groove so that the carriage can be moved laterally independently of said electric motor.

7. Apparatus as defined in claim 6, further comprising wheel means supporting said carriage for moving laterally on a support.

8. Apparatus as defined in claim 1, further comprising a horizontal stationary support, and means slidably mounted on said support and connected to the platform so that the platform is guided in a fixed horizontal path while moving laterally.